United States Patent
Yoshida

(12) 
(10) Patent No.: US 6,557,816 B2
(45) Date of Patent: May 6, 2003

(54) MOTOR MOUNTING STRUCTURE AND DRIVE SHAFT MOUNTING STRUCTURE

(75) Inventor: Futoshi Yoshida, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/778,020

(22) Filed: Feb. 7, 2001

(65) Prior Publication Data
US 2001/0017435 A1 Aug. 30, 2001

(30) Foreign Application Priority Data
Feb. 7, 2000 (JP) ........................................ 2000-029639

(51) Int. Cl.⁷ .............................. F16M 7/00; F16F 15/04
(52) U.S. Cl. ...................... 248/674; 248/572; 248/575; 248/560; 248/557; 267/153; 267/141
(58) Field of Search ................................ 248/674, 572, 248/575, 560, 557; 267/153, 141

(56) References Cited

U.S. PATENT DOCUMENTS

| | | | |
|---|---|---|---|
| 3,741,108 A | * 6/1973 | Stratman et al. | 100/229 A |
| 3,767,866 A | * 10/1973 | Higashida et al. | 360/17 |
| 4,766,587 A | * 8/1988 | Dons et al. | 248/573 |
| 5,020,767 A | * 6/1991 | Ueda et al. | 248/613 |
| 5,280,309 A | * 1/1994 | Zinsmeyer et al. | 346/139 R |
| 5,467,971 A | * 11/1995 | Hurtubise et al. | 188/322.12 |
| 5,487,524 A | * 1/1996 | Bergetz | 248/613 |
| 5,537,810 A | * 7/1996 | Paweletz | 57/406 |
| 5,788,262 A | * 8/1998 | Dazy et al. | 188/321.11 |
| 5,884,893 A | * 3/1999 | Seki et al. | 248/638 |
| 5,899,431 A | * 5/1999 | Lefol | 248/638 |
| 6,328,274 B1 | * 12/2001 | Hayashi | 248/638 |

FOREIGN PATENT DOCUMENTS

JP 8-17135 1/1996 ........... G11B/19/20

* cited by examiner

Primary Examiner—Leslie A. Braun
Assistant Examiner—Ingrid Weinhold
(74) Attorney, Agent, or Firm—Sughrue Mion, PLLC

(57) ABSTRACT

A motor mounting structure having a motor and a mounting portion to which the motor is mounted. When an external force resulting from a load acting in a direction orthogonal to a motor shaft is applied to the shaft, a hardness or configuration of an elastic member disposed between the motor and the mounting portion to which the motor is mounted changes. Alternatively, a configuration of the mounting portion may be changed and the motor mounted such that the motor shaft is parallel to a set target mounting direction. Accordingly, an unbalanced load is not partially applied to a driving force transmission mechanism at the time the motor is rotated, and an excessive load is not placed on the motor.

15 Claims, 10 Drawing Sheets

F I G. 1
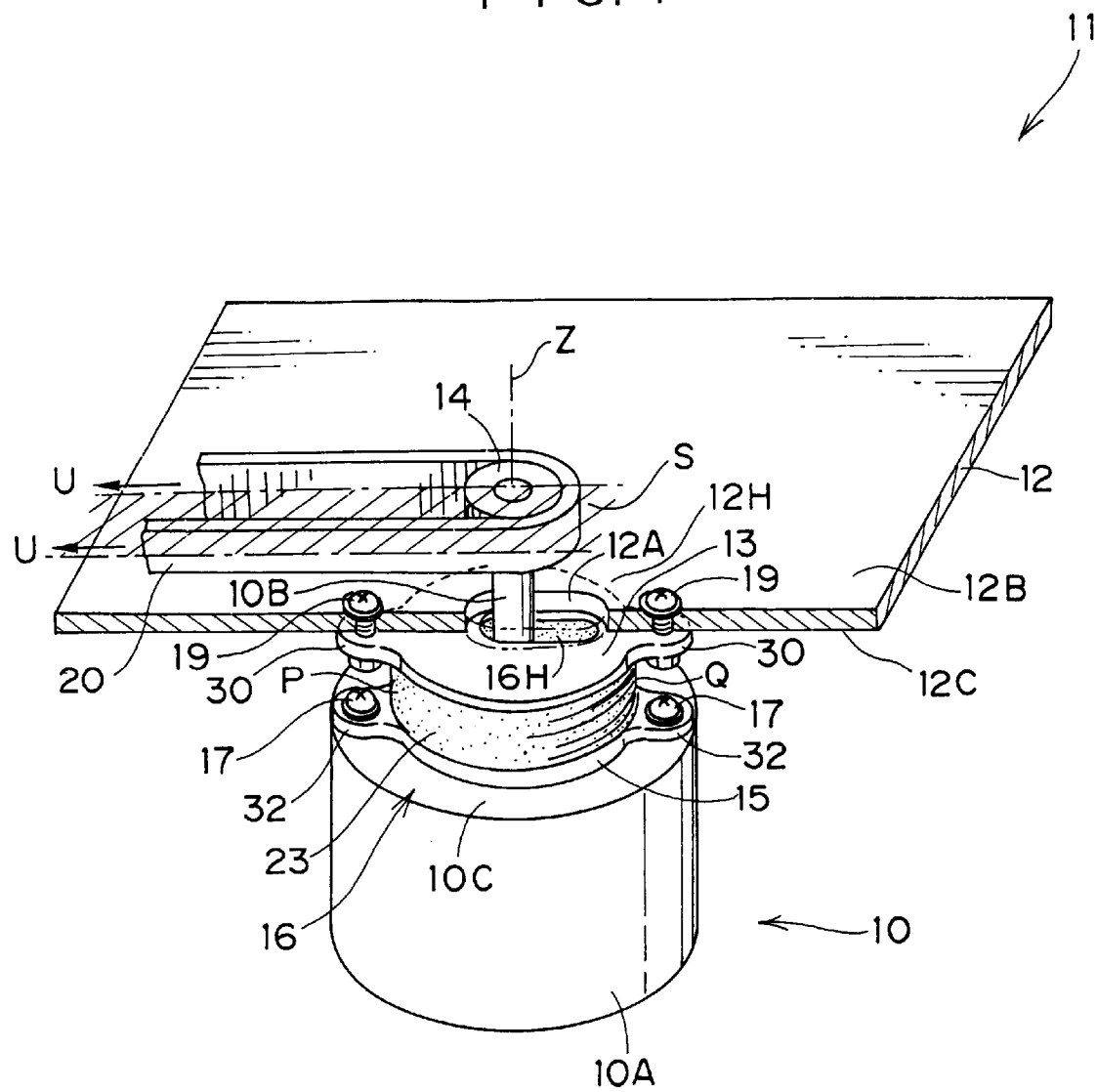

MOTOR MOUNTING STRUCTURE AND DRIVE SHAFT MOUNTING STRUCTURE

BACKGROUND OF THE INVENTION

1. Field of the Invention

The present invention relates to a motor mounting structure in which a load is applied toward a motor shaft in a direction orthogonal to the shaft, and a drive shaft mounting structure in which a load is applied in a direction orthogonal to the drive shaft.

2. Description of the Related Art

Conventionally, when a motor is mounted to a member to which it is to be mounted, such as a frame or the like, oftentimes an elastic member is disposed between the body of the motor and the member to which the motor is to be mounted, as a measure to isolate vibration. For example, in ink jet printers, a compression coil spring is disposed as an elastic member (see Japanese Patent Application Laid-Open (JP-A) No. 8-17135), and in exposure apparatuses, a damper is disposed as an elastic member. Using an exposure apparatus as an example, conventional technology will be described below.

In a conventional exposure apparatus, a damper 72 such as illustrated in FIG. 9 is used as the aforementioned damper. The damper 72 comprises a cylindrical damper body 73, and an upper retention plate 70 and a lower retention plate 71 that are respectively affixed to an upper surface and a lower surface of the damper body 73.

As shown in FIG. 10C, the damper 72 is disposed between a motor 76, which forwardly rotates and rotates in reverse a timing belt 74, and a mounting plate 80. In FIGS. 10A–10C, the upper and lower retention plates have been omitted to clearly describe the deformation of the damper 72.

A through-hole 72H, through which a shaft 82 of the motor 76 is passed, is formed in the damper 72. Further, an exposure head (not illustrated) that scans in accordance with the rotation and reverse rotation of the timing belt 74 is mounted at the timing belt 74.

To mount the motor 76 at the mounting plate 80, the shaft 82 is passed through the through-hole 72H and screws (not illustrated) are passed through mounting holes 84 formed at lower flanges 77 of the lower retention plate 71 (see FIG. 9), whereby the damper 72 is fixed to the motor 76.

Next, the motor 76 to which the damper 72 is fixed is moved to a mounting portion 81 (see FIG. 10A) of the mounting plate 80, so that a distal end portion of the shaft 82 projects at an outer portion (an upper portion) from an opening 80A formed in advance at the mounting plate 80. Screws (not illustrated) are passed through through-holes 85 formed at upper flanges 79 of the upper retention plate 70 (see FIG. 9) to fix the damper 72 to the mounting plate 80 (see. FIG. 10A).

A pulley 86 is mounted at the distal end portion of the shaft 82 that protrudes from the opening 80A (see FIG. 10B), and the timing belt 74 is trained around the pulley 86 (see FIG. 10C).

However, when a U direction tensile force acts on the timing belt 74, a U direction force is applied to the shaft 82 and a bending moment acts on the motor 76. Accordingly, the motor 76 has been mounted to the mounting plate 80 in a state in which the shaft 82 inclines so that the shaft 82 is no longer orthogonal to an orbital plane S.

Moreover, because an unbalanced load is placed on the timing belt 74 and stress (internal stress) becomes partially larger when the motor 76 is driven in this state, problems such as the durability of the timing belt 74 being poor and an excessive load being placed on the motor 76 have arisen.

Such problems are not restricted to exposure apparatuses and ink jet printers. Even in a common mechanism in which a bending moment is applied by an external force applied to a motor shaft, the motor has been mounted in a state in which the motor shaft is not parallel to a set target mounting direction. For this reason, problems such as excessive stress being applied to the mechanism that transmits a driving force from the shaft and an excessive load being placed on the motor have arisen. Moreover, these problems have not only been limited to a case in which an elastic body has been disposed as a measure to isolate vibration, but have also occurred in common mechanisms in which orientation of the motor shaft and orientation of the drive shaft have been regarded as important.

SUMMARY OF THE INVENTION

Taking the above facts into consideration, an object of the present invention is to provide a motor mounting structure with which a motor can be mounted such that a shaft thereof becomes parallel to a set target mounting direction, even when an external force acts on the motor shaft, and to provide a drive shaft mounting structure with which a drive shaft can be mounted such that a shaft thereof becomes parallel to a set target mounting direction, even when an external force acts on the drive shaft.

A motor mounting structure pertaining to a first aspect of the present invention has an elastic member disposed between a motor and a mounting portion to which the motor is mounted, wherein the motor is mounted to the mounting portion via the elastic member, and a motor shaft of the motor has a predetermined angle with respect to a target mounting direction set in advance.

When an external force is not applied to the motor shaft, the motor shaft inclines at a predetermined angle with respect to the target mounting direction that is set in advance. When a force acts on the motor shaft by a driving force transmission mechanism (i.e., a mechanism that transmits a driving force received from the motor shaft) such as a timing belt or the like and a bending moment presumed in advance is applied to the motor, a compressive force acts on the bending side of the elastic member and a tensile force acts on the side opposite the bending side of the elastic member so that the motor shaft becomes parallel to the target mounting direction. The target mounting direction is set, for example, to a direction orthogonal to an orbital plane of the timing belt mounted at a regular position. Further, the predetermined angle is determined in advance giving consideration to parameters such as size of the bending moment, elasticity of the elastic member and so forth.

Accordingly, a mechanism for transmitting a driving force (e.g., a timing pulley and a timing belt mounted at the motor shaft) can be held at a regular position, an unbalanced load is not partially applied to the mechanism for transmitting a driving force and an excessive load is not placed on the motor when the motor is rotated.

In the motor mounting structure of the first aspect of the present invention, the angle of the motor shaft at the time of mounting is preferably adjusted in accordance with a thickness or configuration of the elastic member. Further, the angle of the motor shaft at the time of mounting is adjusted at an inclination angle of the mounting portion with respect to the target mounting direction. Thus, setting of the predetermined angle is easy.

Moreover, in the motor mounting structure of the first aspect of the present invention, the elastic member is preferably provided with a through-hole through which the motor shaft is passed, the through-hole being sufficiently large enough so that the motor shaft does not make contact with an inner wall of the through-hole, and the configuration of the through-hole being formed in a long, substantial ellipse in a direction in which a tensile force acts. Furthermore, a hardness or thickness of the elastic member changes at a tension side and a compression side when a load is applied to the motor shaft.

Still further, in the motor mounting structure of the first aspect of the present invention, the mounting portion is positioned opposite the motor shaft and has a substantially L shape when seen in cross section. The elastic member is disposed so as to make contact with a side surface and a bottom surface of the motor. A hardness of the elastic member changes in correspondence with a difference in compressive force applied thereto when a load is applied to the motor shaft.

In the motor mounting structure of the present invention, wherein the motor mounting structure further comprises a stopper that maintains a posture of the motor shaft on which a moment has acted is preferably provided to abut the housing of the motor.

Accordingly, the motor shaft can be orientated to the target mounting direction, even if the configuration of the elastic member is not strictly formed, so that manufacture of the elastic member becomes remarkably easy. Further, the direction of the motor shaft can be orientated to the target mounting direction by adjusting the position of the stopper, even if the force acting on the motor shaft changes.

A motor mounting structure pertaining to a second aspect of the present invention has a motor and a mounting portion to which the motor is mounted, wherein an end of the mounting portion is joined to a mounting plate by a joint member, another end of the mounting portion is mounted such that an elastic member is disposed between the other end and a press plate, and a motor shaft of the motor has a predetermined angle with respect to a target mounting direction set in advance.

When an external force is not applied to the motor shaft, the motor shaft inclines at a predetermined angle with respect to the target mounting direction that is set in advance. When a force acts on the motor shaft by a driving force transmission mechanism such as a timing belt or the like and a bending moment presumed in advance is applied to the motor, the mounting portion that inclines rotates, together with the motor in the direction in which the bending moment acts, around the joint member disposed at one end of the mounting portion. At this time, because the elastic member is disposed between another end of the mounting portion and the press plate, the motor shaft becomes parallel to the target mounting direction. The target mounting direction is set, for example, to a direction orthogonal to an orbital plane of the timing belt mounted at a regular position. Further, the predetermined angle is determined in advance giving consideration to parameters such as size of the bending moment, elasticity of the elastic member and so forth.

Accordingly, a mechanism for transmitting a driving force can be held at a regular position, an unbalanced load is not partially applied and an excessive load is not placed on the motor at the time the motor is rotated.

In the motor mounting structure of the second aspect of the present invention, the angle of the motor shaft at the time of mounting is preferably adjusted at an inclination angle of the mounting portion with respect to the target mounting direction or adjusted in accordance with dimensions of the elastic member.

Further, in the motor mounting structure of the second aspect of the present invention, the elastic member is not provided with a through-hole for the motor shaft. Moreover, a hardness of the elastic member changes corresponding to a compressive force applied thereto when a load is applied to the motor shaft.

A damper pertaining to another aspect of the present invention is a damper for absorbing vibration between a motor and a motor mounting portion, the damper comprising: a pair of retention plates, one retention plate being mountable to the motor mounting portion and the other retention plate being mountable to the motor; and a resiliently deformable member having opposite ends, each end having a periphery, with one end connected to one of the retention plates and the opposite end connected to the other retention plate, the resiliently deformable member having opposite sides extending from the periphery of one end to the other of the resiliently deformable member, with one side being longer than the opposing side.

Preferably, in the damper of the present invention, the motor includes a motor shaft, and a slot is defined through the retention plates and the resiliently deformable member which receives the motor shaft therethrough when one of the retention plates is mounted to the motor.

With regard to a drive shaft mounting structure pertaining to another aspect of the present invention, in a drive shaft mounting structure provided with a drive shaft, a bearing member disposed around the drive shaft, and an elastic member that is supported at a mounted portion and abuts the peripheral edge of the bearing member, wherein the elastic member is disposed so that the drive shaft has a predetermined angle with respect to a target mounting direction set in advance.

Accordingly, the drive force transmission mechanism (e.g., the timing pulley and timing belt entrained on the drive shaft) is kept at a normal position, and an unbalanced load is not applied partially to the drive force transmission mechanism at the time the drive shaft rotates.

Further, in the drive shaft mounting structure of the present invention, wherein the drive shaft mounting structure further comprises a gear to which the driving force is transmitted is preferably provided at an end of the drive shaft and a pulley that transmits a driving force is preferably provided at another end of the drive shaft.

Accordingly, in a state in which the pulley faces the target mounting direction, the belt trained to the pulley rotates. Thus, an unbalanced load is not partially applied to the belt. Further, an excessive load is not applied to the gear mounted to the drive shaft and the mechanism that transmits a torque to the gear.

BRIEF DESCRIPTION OF THE DRAWINGS

FIG. 1 is a perspective view illustrating a motor mounting structure pertaining to a first embodiment of the present invention.

FIG. 3C illustrates a state in which a timing belt is trained around a pulley. It should be noted that the damper is conceptually depicted, i.e., the upper and lower retention plates are omitted.

FIG. 4C illustrates a state in which a timing belt is trained around a pulley. It should be noted that the damper is conceptually depicted.

FIG. 5C illustrates a state in which a timing belt is trained around a pulley.

FIG. 6B illustrates a state in which a timing belt is trained around a pulley. It should be noted that the damper is conceptually depicted.

FIG. 7C illustrates a state in which a timing belt is trained around a pulley. It should be noted that the damper is conceptually depicted.

FIG. 8C illustrates a state in which a timing belt is trained around a pulley.

DESCRIPTION OF THE PREFERRED EMBODIMENTS

Figure 2:
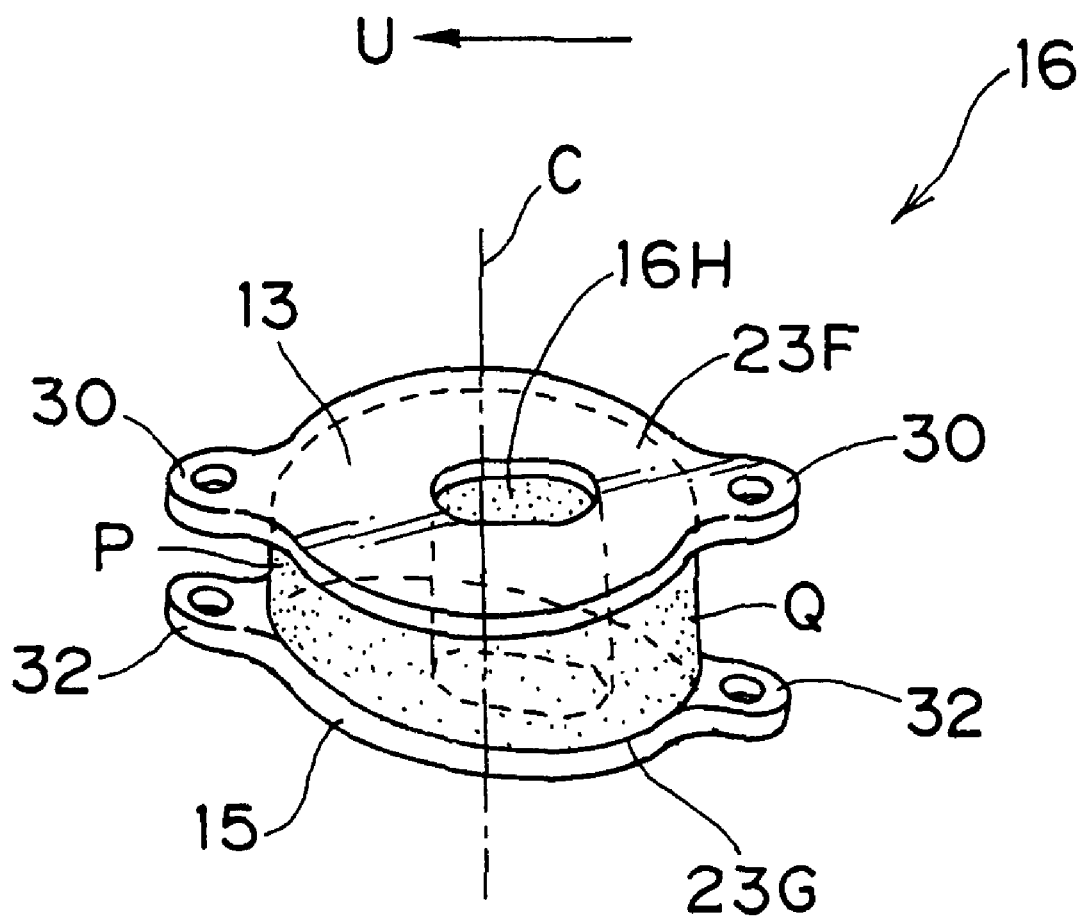
FIG. 2 is a perspective view of a damper used in the motor mounting structure of the first embodiment of the present invention.

Using an exposure apparatus as an example, embodiments of the present invention will hereinafter be described in relation to drawings.

As illustrated in FIG. 1, in a motor mounting structure 11 pertaining to a first embodiment, a damper 16 is disposed as an elastic member between a motor 10 and a mounting plate 12, including an obverse surface 12B and a reverse surface 12C, to which the motor 10 is mounted. The damper 16 comprises a damper body 23, and an upper retention plate 13 and a lower retention plate 15 that are respectively adhered to an upper surface and a lower surface of the damper body 23.

The upper retention plate 13 abuts against a reverse surface 12C of the mounting plate 12, and the lower retention plate 15 abuts against an upper surface 10C of a motor body 10A. The upper surface 10C of the motor body 10A is substantially planar. The mounting plate 12, the upper retention plate 13 and the lower retention plate 15 also are each substantially planar. In the first embodiment of the present invention, rubber is used as a material for the damper body 23. However, another material such as urethane or the like may also be used as long as it exhibits a damping function.

A motor shaft 10B (referred to hereinafter simply as a "shaft 10B") protrudes upward from the upper surface 10C of the motor body 10A. A through-hole 16H through which the shaft 10B passes is formed in the damper 16. Moreover, an opening 12A through which the shaft 10B is passed is also formed in a mounting portion 12H at which the motor 10 is mounted.

A pulley 14 is mounted to a distal end portion of the shaft 10B, and a timing belt 20 is trained around the pulley 14 after the motor 10 has been mounted at the mounting portion 12H. A tensile force acts on the trained timing belt 20 in a U direction parallel to an orbital plane S of the timing belt 20. As a result, a force is applied in the U direction to the shaft 10B, whereby a bending moment is applied to the motor 10 and a state is created in which the shaft 10B becomes orthogonal to the orbital plane S of the timing belt 20. In order for such a state to happen, consideration is given to the hardness of the damper 16, and dimensions of the damper body 23 are determined in advance as will be described below.

In a state in which a force such as a bending moment is not applied to the damper 16, as illustrated in FIG. 2, a thickness at a bending direction side P of the damper body 23 is not as thick as a thickness of an opposing side Q.

The damper body 23 is cut out from a cylindrical rubber body, and a damper body upper surface 23F adjacent to the upper retention plate 13 is a plane orthogonal to a central axis C of the damper material. A damper body lower surface 23G adjacent to the lower retention plate 15 is a plane forming a predetermined angle with the central axis C of the damper material.

An upper flange 30 having a screw hole is formed at the upper retention plate 13 at the P side and Q side thereof. Similarly, a lower flange 32 having a screw hole is formed at the lower retention plate 15 at the P side and Q side thereof.

The through-hole 16H has a diameter sufficiently larger than that of the shaft 10B. In the states illustrated in FIG. 1 and FIG. 3C, the shaft 10B does not make contact with an inner wall of the through-hole 16H. Further, the through-hole 16H is configured in a long, substantial ellipse in the U direction so that the shaft 10B can be moved from the state illustrated in FIG. 3A to the state illustrated in FIG. 3C.

Figure 3A:
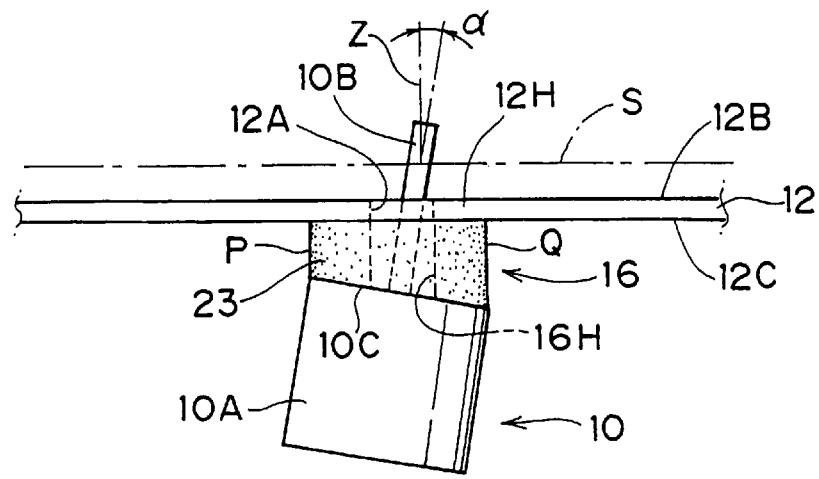
FIGS. 3A to 3C are front views respectively illustrating steps of a process by which the motor is mounted to a mounting plate via the damper in the first embodiment of the present invention.
Figure 3B:
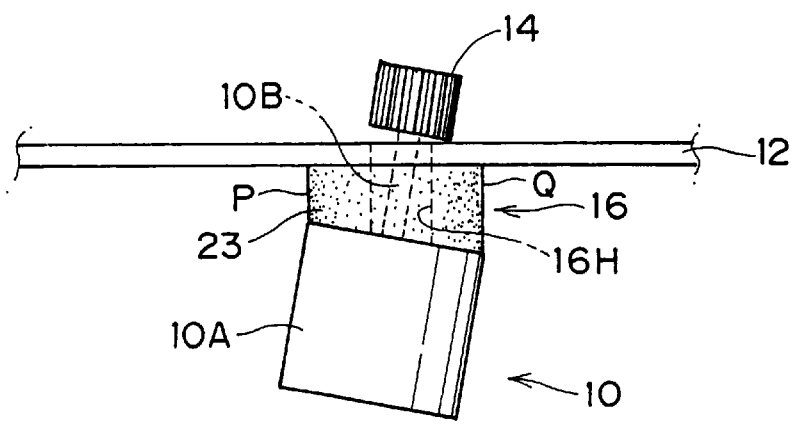
Figure 3C:
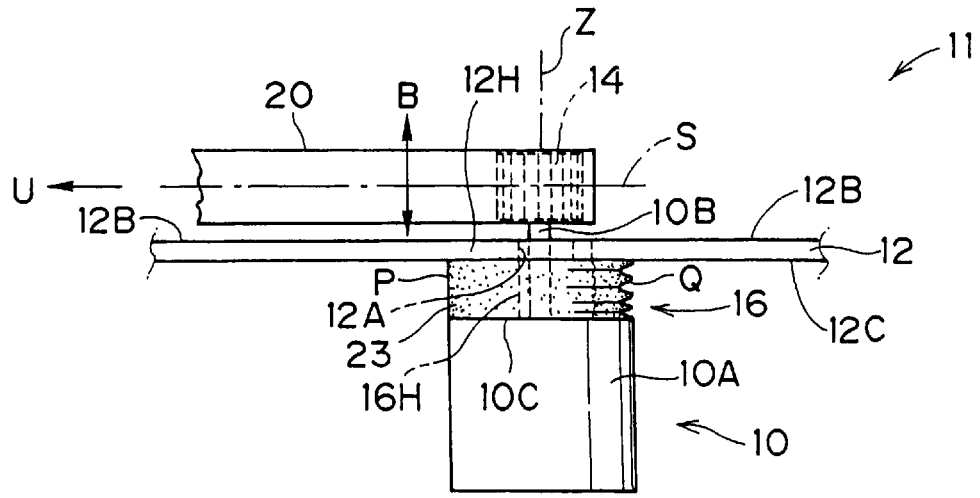

It should be noted that the upper and lower retention plates are omitted from FIGS. 3A to 3C in order to clearly depict the deformation of the damper 16.

The process by which the motor 10 is mounted to the mounting plate 12 will now be described. The shaft 10B is passed through the through-hole 16H of the damper 16, and the lower retention plate 15 is fixed to the motor 10 by screws 17 (see FIG. 1). The motor 10 to which the damper 16 is fixed is moved to a mounting portion 12H so that the distal end portion of the shaft 10B projects from an opening 12A (see FIG. 3A), and the upper retention plate 13 is fixed to the mounting plate 12 by screws 19 (see FIG. 1). In this state, the shaft 10B inclines at a predetermined angle a (see FIG. 3A) with respect to a target mounting direction Z. The target mounting direction is a direction orthogonal to the orbital plane S of the timing belt 20.

Next, as illustrated in FIG. 3B, the pulley 14 is mounted to the distal end portion of the shaft 10B.

As illustrated in FIG. 3C, when the timing belt 20 is trained around the pulley 14, a force is applied in the U direction to the shaft 10B, whereby a bending moment is applied to the motor 10. As a result, a state in which the shaft 10B is parallel to the target mounting direction Z (i.e., a state in which the shaft 10B is orthogonal to the orbital plane S) is maintained. By driving the motor 10 in this state, the timing belt 20 is rotated forwardly or rotated in reverse parallel to the orbital plane S.

Accordingly, tensile force arising in the timing belt 20 at the time the timing belt 20 is rotated forwardly or rotated in reverse is uniform at the direction parallel to the shaft 10B (i.e., the width direction B (see FIG. 3C) of the timing belt 20). Therefore, an unbalanced load is not applied to the timing belt 20. Consequently, durability of the timing belt 20 is improved, and application of an excessive load on the motor 10 when the motor 10 is rotated is prevented.

Next, a second embodiment of the present invention will be described. In the second embodiment, the configuration of a mounting plate is manipulated as compared with the mounting plate of the first embodiment. Structural elements in the second embodiment that are the same as those already described in the first embodiment are designated with the same reference numerals and description thereof will be omitted.

Figure 4A:
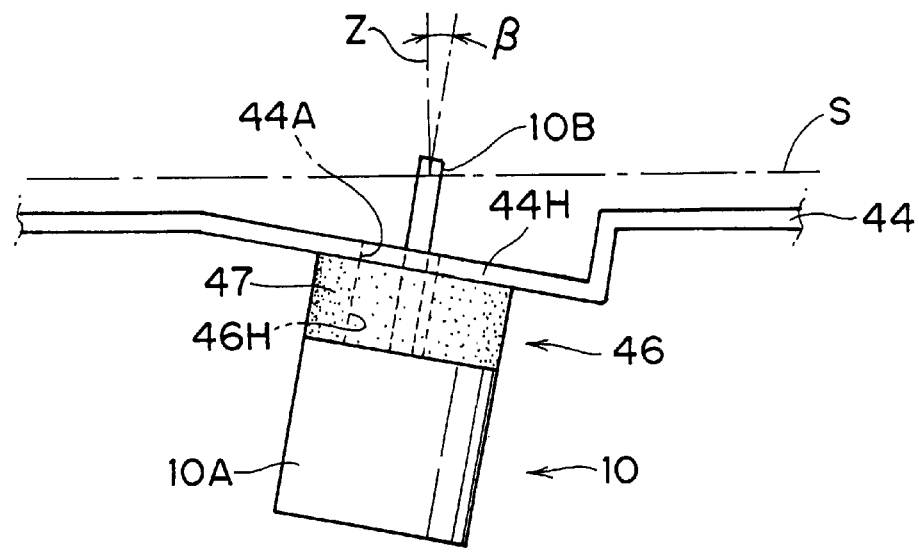
FIGS. 4A to 4C are front views respectively illustrating steps of a process by which a motor is mounted to a mounting plate via a damper in a second embodiment of the present invention.
Figure 4B:
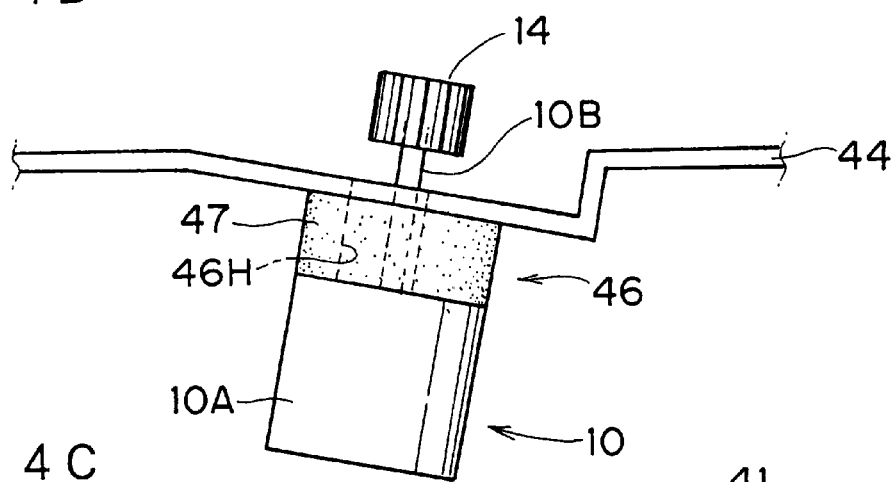
Figure 4C:
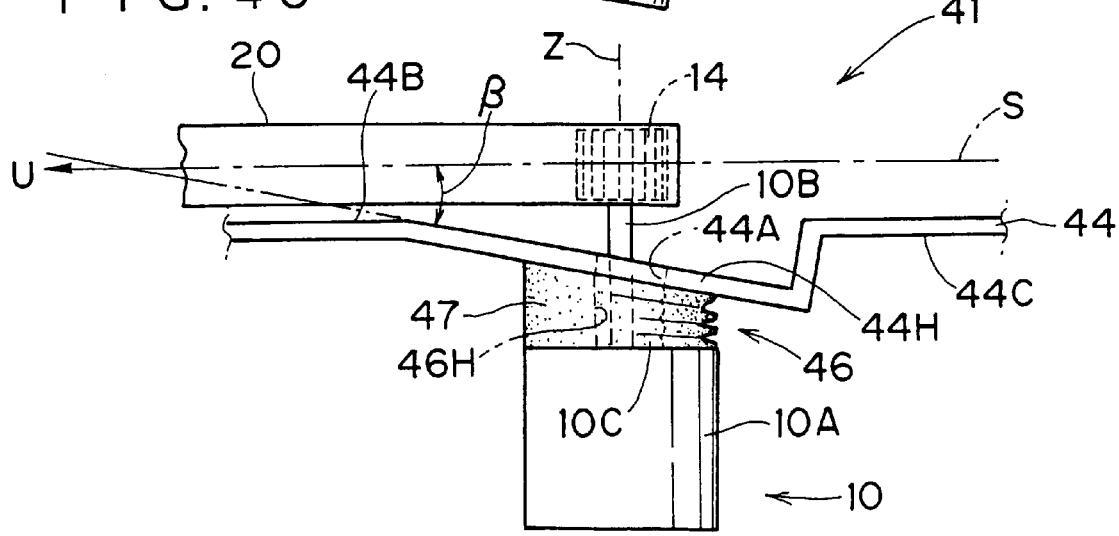

As illustrated in FIG. 4C, in a motor mounting structure 41 pertaining to the second embodiment of the present invention, a damper 46 is disposed between the upper surface 10C of the motor 10 and a mounting plate 44 to which the motor 10 is mounted.

The damper 46 comprises a damper body 47 that is substantially cylindrical in a state in which the damper body 47 is unburdened, and an upper retention plate and a lower retention plate that are respectively adhered to an upper surface and a lower surface of the damper body 23. It should be noted that the upper and lower retention plates have been omitted from FIGS. 4A to 4C in order to clearly depict the deformation of the damper 46.

A through-hole 46H through which the shaft 10B passes is formed in the damper 46. Moreover, an opening 44A through which the shaft 10B passes is also formed in a motor-mounting portion 44H of the mounting plate 44.

As illustrated in FIG. 4C, in the motor mounting structure 41, the pulley 14 is affixed to the distal end portion of the shaft 10B, and the timing belt 20 is trained around the pulley 14 after the motor 10 has been mounted at the mounting plate 44. A tensile force acts on the trained timing belt 20 in a U direction along the orbital plane S. As a result, a force is applied in the U direction to the shaft 10B, whereby a bending moment is applied to the motor 10 and a state is created in which the shaft 10B becomes orthogonal to the orbital plane S. In order for such a state to happen, consideration is given to the hardness of the damper 46, and the configuration of the motor-mounting portion 44H is determined in advance as will be described below.

The motor-mounting portion 44H is a worked portion formed by a portion of the planar mounting plate 44 being worked by a press or the like. A portion of the reverse surface 44C of the planar mounting plate 44 includes a surface of the motor-mounting portion 44H. This surface is formed in an inclined plane that is inclined by a predetermined angle β with respect to the orbital plane S, such that when the bending moment is not acting on the motor 10, the shaft 10B inclines with respect to the orbital plane S, and when the bending moment acts on the motor 10, the shaft 10B becomes orthogonal to the orbital plane S.

The structural portion obverse 44B that is not worked is parallel to the orbital plane S.

The process by which the motor 10 is mounted to the mounting plate 44 will now be described. The shaft 10B is passed through the through-hole 46H of the damper 46, and the damper 46 is fixed to the motor 10 by screws (not illustrated). The motor 10 to which the damper is fixed is moved to the motor-mounting portion 44H so that the shaft 10B passes through an opening 44A (see FIG. 4A) and the damper 46 to which the motor 10 is attached is fixed to the mounting plate 44 by screws (not illustrated). In this state, the shaft 10B inclines at a predetermined angle with respect to a target mounting direction Z. The target mounting direction is a direction orthogonal to the orbital plane S of the timing belt 20.

Next, as illustrated in FIG. 4B, the pulley 14 is mounted to the distal end portion of the shaft 10B.

As illustrated in FIG. 4C, when the timing belt 20 is trained around the pulley 14, a force is applied in the U direction to the shaft 10B, whereby a bending moment is applied to the motor 10. As a result, a state in which the shaft 10B is parallel to the target mounting direction Z (i.e., a state in which the shaft 10B becomes orthogonal to the orbital plane S) is maintained. Consequently, the timing belt 20 is rotated forwardly or rotated in reverse parallel to the orbital plane S.

Accordingly, an effect similar to that resulting from the operation of the first embodiment can be achieved. Further, because a cylindrical damper body 47 may be used as it is, production of the damper 46 is easy.

Figure 5A:
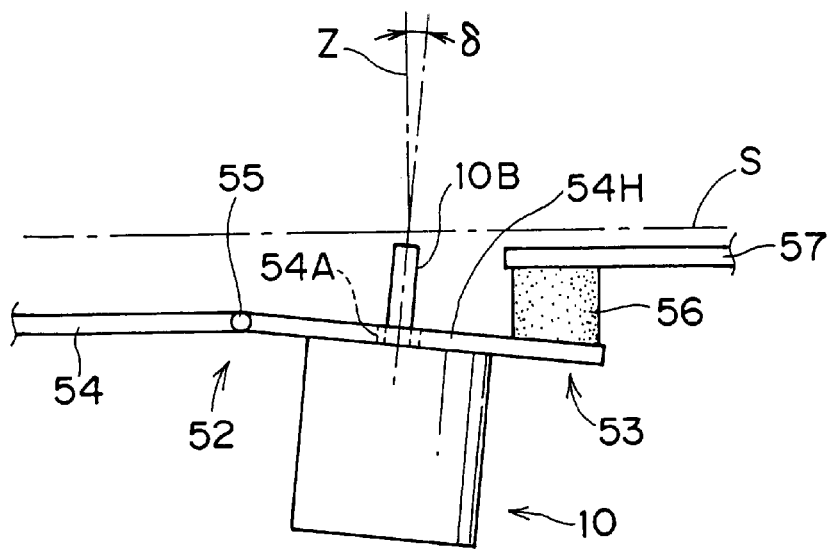
FIGS. 5A to 5C are front views respectively illustrating steps of a process by which a motor is mounted to a mounting plate via a damper in a third embodiment of the present invention.

Next, a third embodiment will be described. As illustrated in FIG. 5C, in a motor mounting structure 51 pertaining to the third embodiment, a mounting portion 54H to which the motor 10 is mounted is a plate-shaped member. One end 52 of the mounting portion 54H is joined to a mounting plate 54 by a hinge that is a joint member 55. A damper 56 is disposed between another end 53 of the mounting portion 54H and a press plate 57. An opening 54A through which the shaft 10B passes is formed at the mounting portion 54H. In the present embodiment, the joint member 55 is a hinge. However, a pin or a shaft or the like may also be used as long as the mounting portion 54H is connected to the mounting plate 54 and rotation is permitted around the joint member 55.

Further, as illustrated in FIG. 5C, in the motor mounting structure 51, the pulley 14 is mounted to the distal end portion of the shaft 10B, and the timing belt 20 is trained around the pulley 14 after the motor 10 has been mounted at the mounting portion 54H. A tensile force acts on the trained timing belt 20 in a U direction along the orbital plane S. As a result, a force is applied in the U direction to the shaft 10B, whereby a bending moment is applied to the motor 10 and a state is created in which the shaft 10B becomes orthogonal to the orbital plane S. In order for such a state to happen, consideration is given to the hardness corresponding to the compressive force applied to the damper 56, and dimensions such as thickness and the like of the damper 56 are determined in advance.

Namely, dimensions of the damper 56 are determined such that when the bending moment is not acting on the motor 10, the shaft 10B inclines with respect to the orbital plane S, and when the bending moment acts on the motor 10, the shaft 10B becomes orthogonal to the orbital plane S. It should be noted that the mounting plate 54 is parallel to the orbital plane S.

The process by which the motor 10 is mounted to the mounting portion 54H linked by a hinge to the mounting plate 54 will now be described. First, the damper is adhered to an upper surface at the end 53 of the mounting portion 54H.

Next, the shaft 10B is passed through the opening 54A (see FIG. 5A), and the motor 10 is fixed to the mounting portion 54H by screws (not illustrated). In this state, the shaft 10B inclines at a predetermined angle with respect to a target mounting direction Z. The target mounting direction is a direction orthogonal to the orbital plane S of the timing belt 20.

Figure 5B:
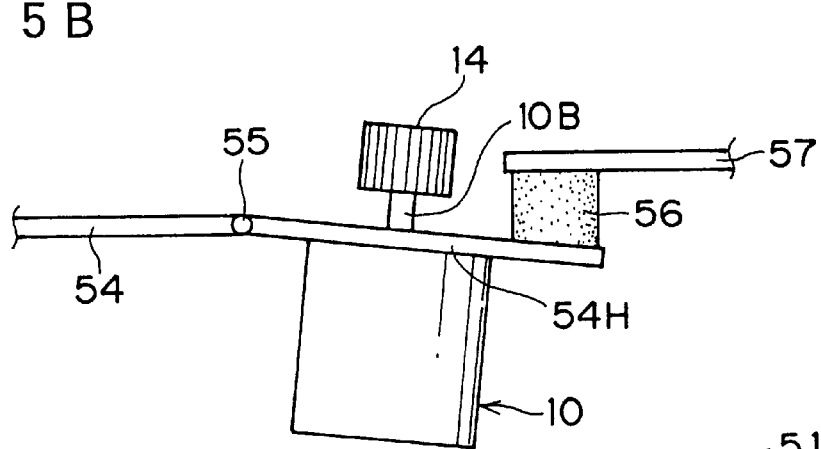
Figure 5C:
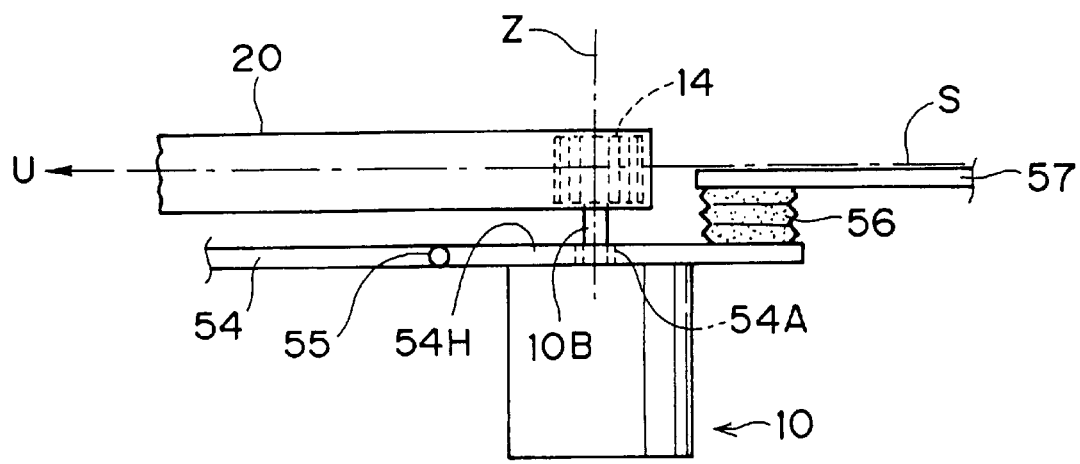

Thereafter, as illustrated in FIG. 5B, the pulley 14 is mounted to the distal end portion of the shaft 10B.

Moreover, as illustrated in FIG. 5C, when the timing belt 20 is trained around the pulley 14, a force is applied in the U direction to the shaft 10B, whereby a bending moment is applied to the motor 10. As a result, a state in which the shaft 10B is parallel to the target mounting direction Z (i.e., a state in which the shaft 10B becomes orthogonal to the orbital plane S) is maintained. Consequently, the timing belt 20 is rotated forwardly or rotated in reverse parallel to the orbital plane S.

Accordingly, an unbalanced load is not applied to the timing belt 20. Consequently, durability of the timing belt 20 is improved, and application of an excessive load on the motor 10 when the motor 10 is rotated is prevented. Moreover, because there is no need to form a through-hole in the damper 56 and the configuration of the damper 56 is kept simple, production of the damper 56 is easy.

Figure 6A:
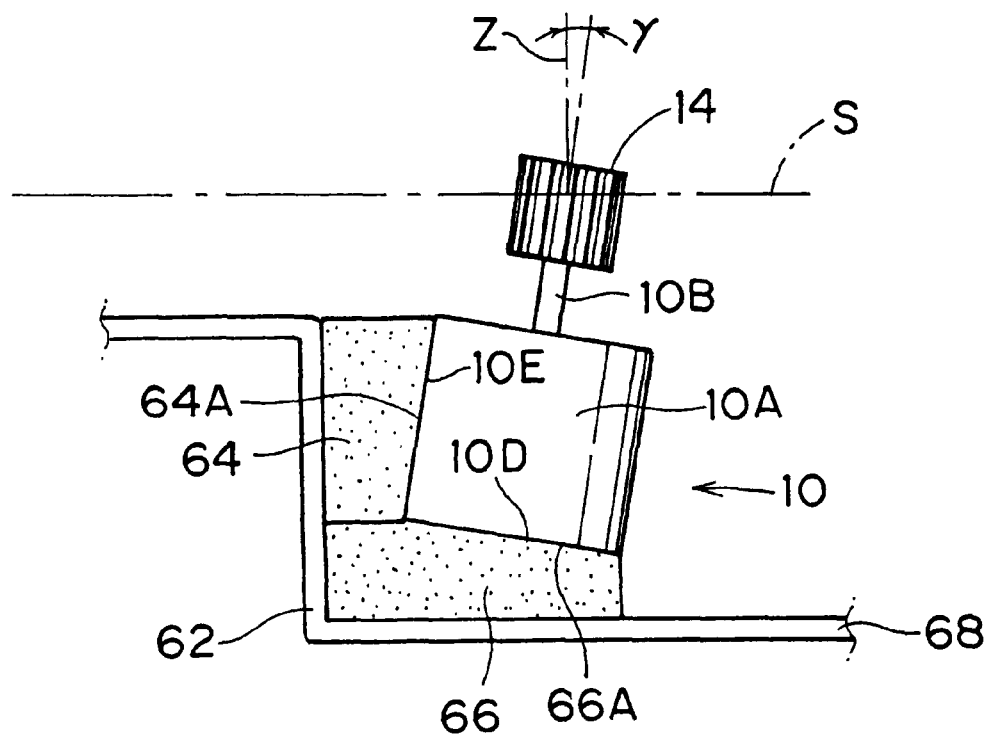
FIGS. 6A and 6B are front views respectively illustrating steps of a process by which a motor is mounted to a mounting plate via a damper in a fourth embodiment of the present invention.
Figure 6B:
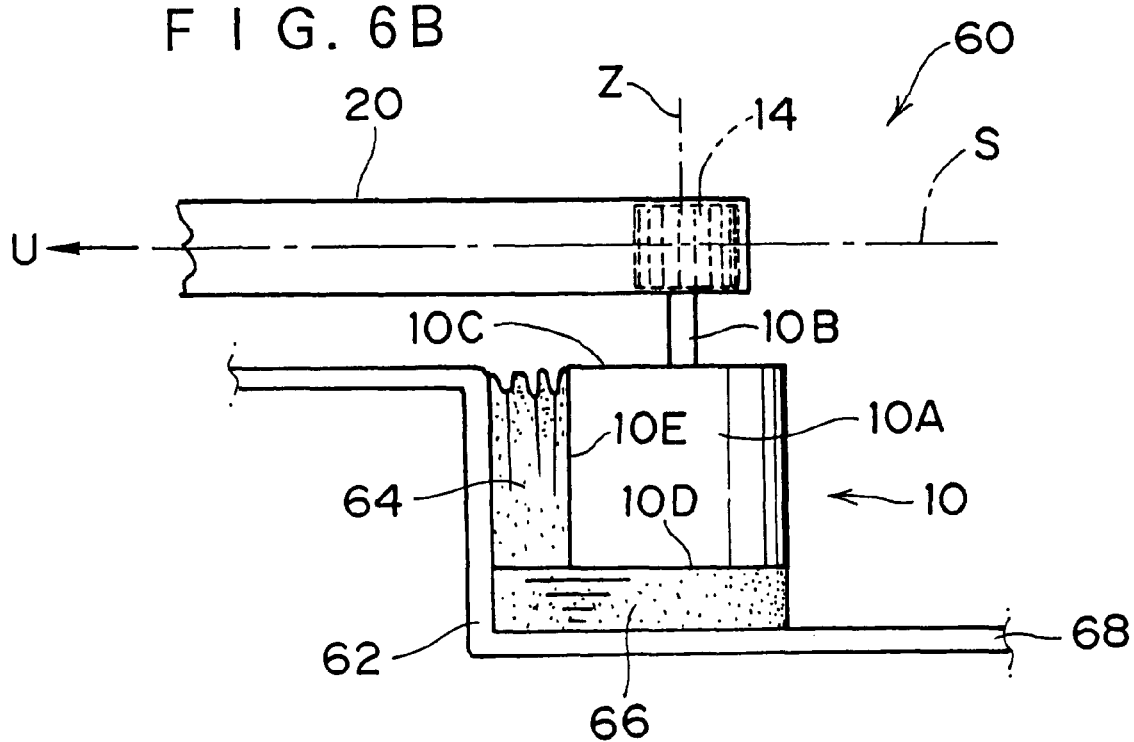

A fourth embodiment of the present invention will now be described. As illustrated in FIG. 6B, in a motor mounting structure 60 pertaining to the fourth embodiment, a mounting portion 62, to which the motor 10 is mounted, is formed in a substantial L shape when seen in a cross sectional view. The mounting portion 62 is formed by, for example, working a flat plate 68 with a press. A damper 64 is disposed between a side surface 10E of the motor 10 and the mounting portion 62. Further, a damper 66 is disposed between a bottom surface 10D of the motor 10 and the mounting portion 62.

After the motor 10 has been disposed at the mounting portion 62, the timing belt 20 is trained around the pulley 14 mounted to the distal end portion of the shaft 10B. A tensile force acts on the trained timing belt 20 in the U direction along the orbital plane S, whereby a force is applied in the U direction to the shaft 10B and a bending moment is applied to the motor 10 so that the shaft 10B is orthogonal to the orbital plane S. In order for such a state to happen, consideration is given to the dimensions of the motor 10 and the hardness of the dampers 64 and 66, and respective configurations of the dampers 64 and 66 (see FIG. 6A) are determined in advance. Here, the dampers 64 and 66 may be any shape other than a rectangle.

The process by which the motor 10 is mounted to the mounting portion 62 will now be described. As illustrated in FIG. 6A, the motor 10, having the pulley 14 affixed to the distal end portion of the shaft 10B, is moved to the mounting portion 62. The side surface 10E of the motor body 10A is brought into contact with a side surface 64A of the damper 64, and the bottom surface 10D of the motor body 10A is brought into contact with an upper surface 66A of the damper 66, so that the motor 10 is thereby disposed with sides thereof in contact with corresponding sides of the dampers 64 and 66. In the present embodiment, the shaft 10B inclines at a predetermined angle γ with respect to a target mounting direction Z. The target mounting direction Z is a direction orthogonal to the orbital plane S.

Thereafter, as illustrated in FIG. 6B, the timing belt 20 is trained around the pulley 14. As a result, a force is applied in the U direction to the shaft 10B, whereby a bending moment is applied to the motor 10 and a state in which the shaft 10B is parallel to the target mounting direction Z (i.e., a state in which the shaft 10B becomes orthogonal to the orbital plane S) is maintained. Consequently, by driving the motor 10 in this state, the timing belt 20 is rotated forwardly or rotated in reverse parallel to the orbital plane S.

Accordingly, an effect similar to that resulting from the operation of the first embodiment can be achieved. Furthermore, in the fourth embodiment, as illustrated in FIG. 6B, the damper 66 is not disposed between the upper surface 10C of the motor body 10A and the mounting portion 62. Hence, the embodiment is extremely effective when a motor mounting structure in which the mounting portion 62 is positioned opposite the shaft 10B is desired.

According to the structures of the present invention described above, a mechanism for transmitting a driving force can be held at a regular position. Thus, an unbalanced load is not partially applied to the driving force transmission mechanism and an excessive load is not placed on the motor when the motor is rotated.

Figure 7A:
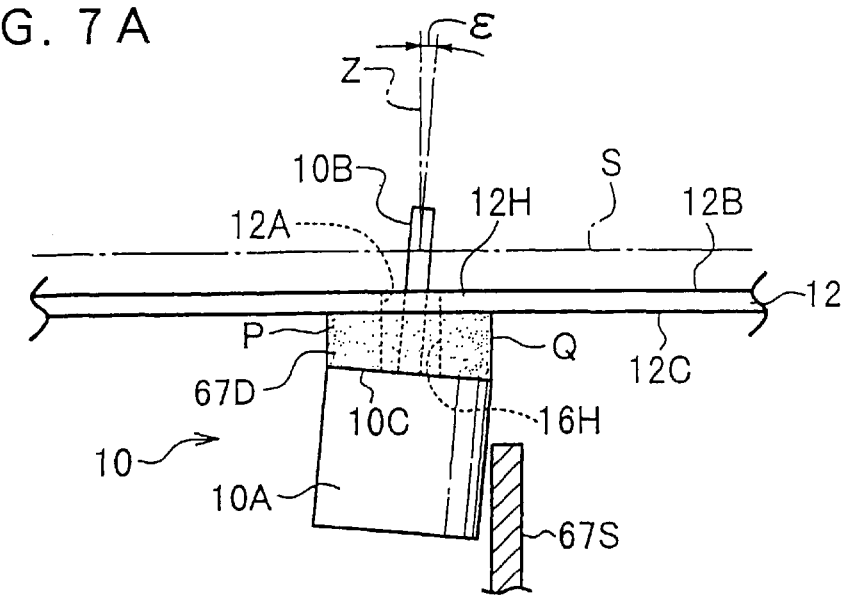
FIGS. 7A to 7C are front views respectively illustrating steps of a process by which a motor is mounted to a mounting plate via a damper in a fifth embodiment of the present invention.
Figure 7B:
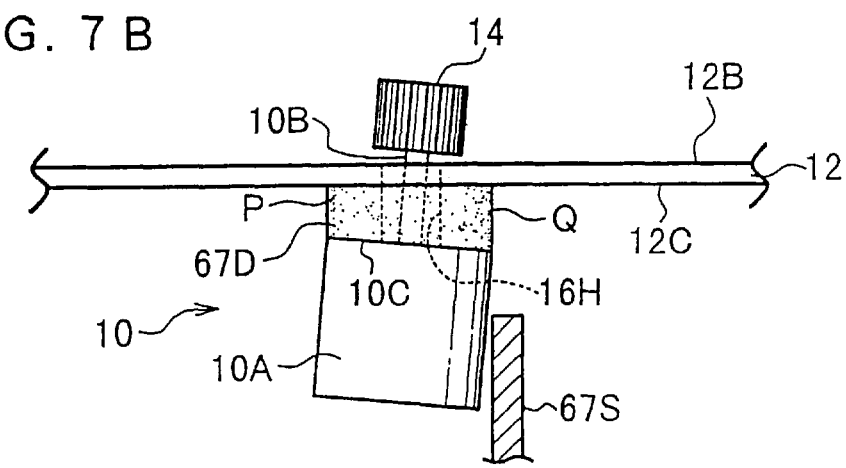
Figure 7C:
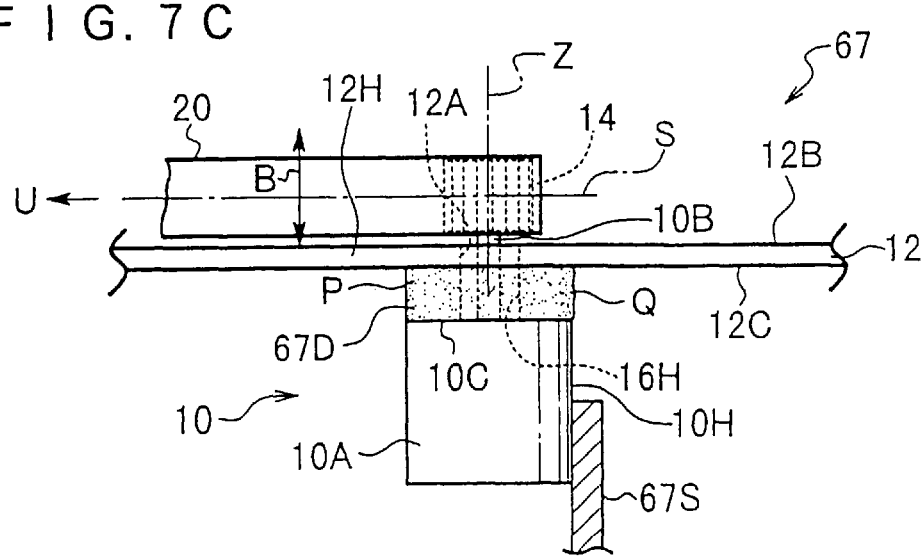

Next, description will be given of a fifth embodiment. As illustrated in FIG. 7C, in a motor mounting structure 67 pertaining to the fifth embodiment, in comparison with the first embodiment, a stopper 67S that maintains the position of the motor 10 is provided. In comparison with the damper 16 described in connection with the first embodiment, a damper 67D that is disposed between the motor 10 and the mounting plate 12 has at a Q side thereof (the side facing the bending direction side of the bending moment acting on the damper) a thickness that is rather thin. In FIGS. 7A–7C, the upper and lower retention plates have been omitted to clearly describe the deformation of the damper.

When the timing belt 20 is trained around the pulley 14 of the shaft 10B, the housing 10H of the motor 10 abuts the stopper 67S. The stopper 67S is disposed such that a state is achieved in which the shaft 10B is orthogonal to the orbital plane S. The stopper 67S and the mounting plate 12 are in a state of non-contact with one another, and vibration transmitted to the stopper 67S is prevented from being transmitted to the mounting plate 12.

The process by which the motor 10 is mounted to the mounting plate 12 will now be described. As illustrated in FIG. 7A, similar to the first embodiment, the distal end portion of the shaft 10B projects from the opening 12A. In this state, the shaft 10B inclines at a predetermined angle with respect to the target mounting direction Z.

Next, as illustrated in FIG. 7B, the pulley 14 is mounted to the distal end portion of the shaft 10B.

As illustrated in FIG. 7C, when the timing belt 20 is trained around the pulley 14, a force is applied in the U direction to the shaft 10B, whereby a bending moment is applied to the motor 10. As a result, the housing 10H of the motor 10 abuts the stopper 67S and the shaft 10B becomes parallel with the target mounting direction Z, whereby a state in which the shaft 10B is orthogonal to the orbital plane S is maintained. Consequently, by driving the motor 10 in this state, the timing belt 20 is rotated forwardly or rotated in reverse parallel to the orbital plane S.

Accordingly, an effect similar to that resulting from the operation of the first embodiment can be achieved. Further, even if production precision of the damper 67D is more or less rough, the stopper 67S fulfills an auxiliary role so that the direction of the shaft 10B is oriented in the target mounting direction Z. Thus, manufacture of the damper 67D is easy.

It should be noted that there are no particular limitations on the shape of the stopper 67S. For example, a flat plate configuration or U-shaped configuration is also possible.

Figure 8A:
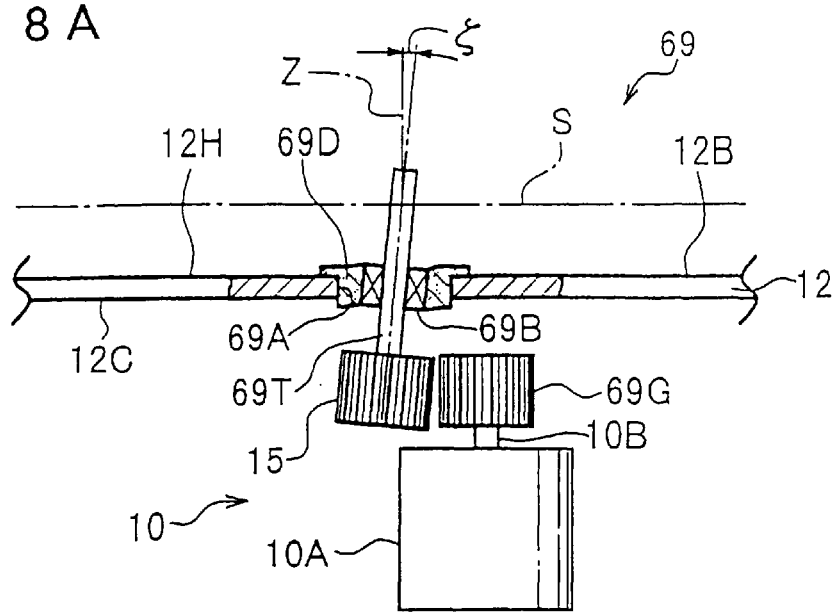
FIGS. 8A to 8C are front views respectively illustrating steps of a process by which a drive shaft is mounted via a damper in a sixth embodiment of the present invention.

Next, description will be given of a sixth embodiment. As illustrated in FIG. 8C, in a drive shaft mounting structure 69 pertaining to the sixth embodiment, a drive shaft 69T that passes through an opening 69A (having dimensions slightly larger than the opening 12A described in the first embodiment) of the mounting plate 12 is provided. A pulley 14 is mounted at an upper end of the drive shaft 69T, and a gear 15 is mounted at a lower end of the same. A bearing member 69B to rotatably maintain the drive shaft 69T is also provided.

A damper 69D is also provided between the bearing member 69B and the opening edge of the opening 69A.

A gear 69G mounted to the shaft 10B of the motor 10 meshes with the gear 15. Moreover, a motor body 10A is fixed at a set position by a fixing member or the like (not illustrated) so that the motor 10 does not move due to a pressure transmitted from the gear 15. Consequently, even if a moment is applied to the drive shaft 69T by the tensile force from the timing belt 20 in the U direction, the gear 69G fulfills a stopper role.

In this manner, consideration is given to the hardness of the damper 69D, and the tensile force from the timing belt 20 and the dimensions of the opening 69A and the damper 69D are determined so that, due to the tensile force from the timing belt 20 and the bearing pressure of the gear 69G, a state is reached in which the drive shaft 69T is parallel to the target mounting direction Z, i.e., a state is reached in which the drive shaft 69T is orthogonal to the orbital plane S.

The process by which the drive shaft 69T is mounted will now be described. As illustrated in FIG. 8A, the damper 69D and the bearing member 69B are provided at the opening 69A. The upper end of the drive shaft 69T, opposite the lower end to which the gear 15 mounted, is passed through the bearing member 69B to project from the opening 12A. In this state, the drive shaft 69T inclines at a predetermined angle ζ with respect to the target mounting direction Z.

Figure 8B:
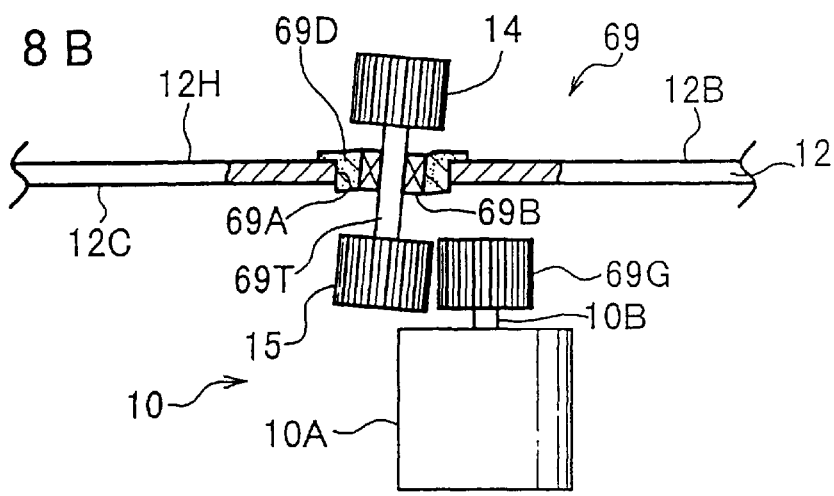
Figure 8C:
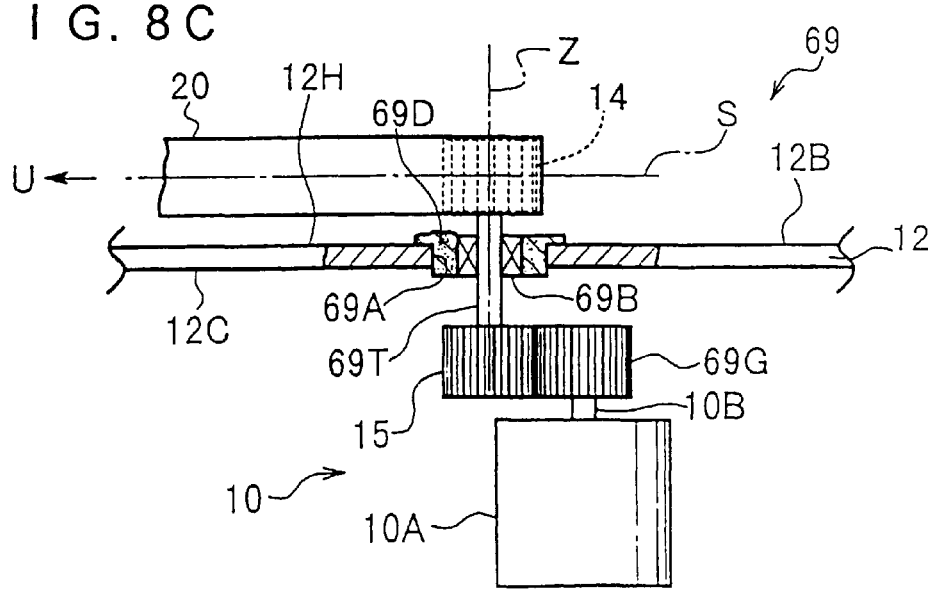
Figure 9:
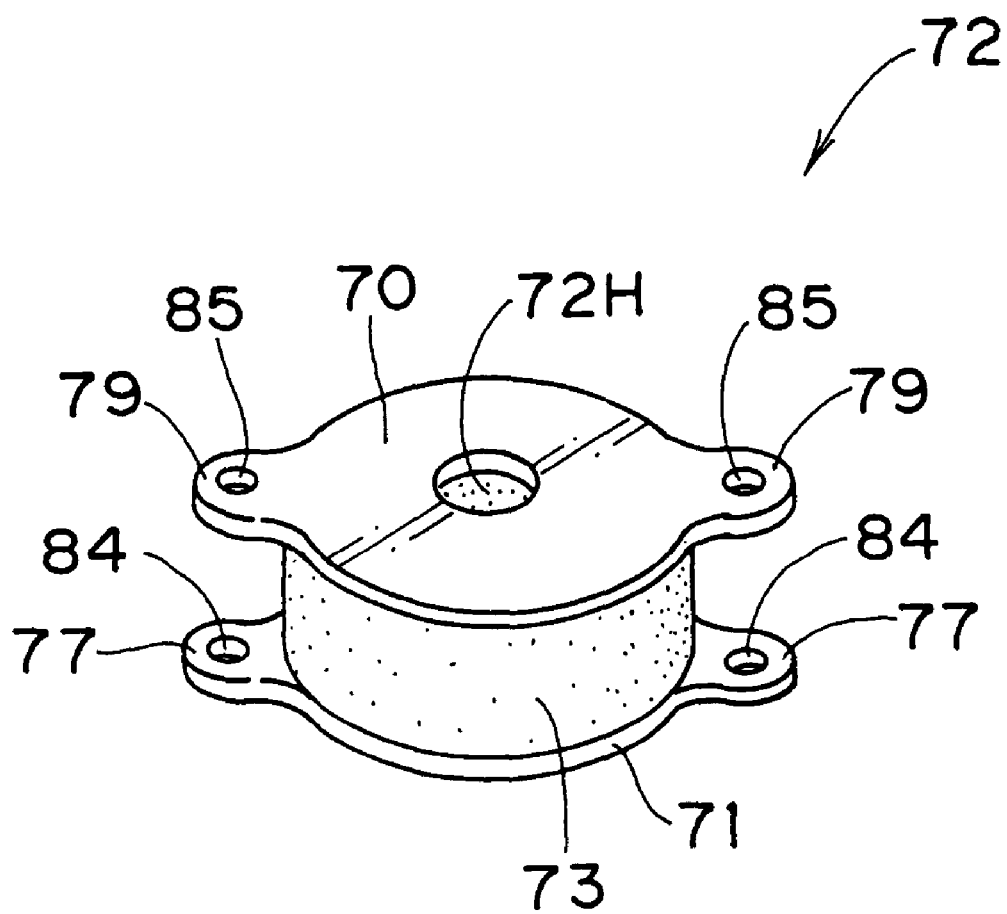
FIG. 9 is a perspective view of a damper used in conventional motor mounting structures.
Figure 10A:
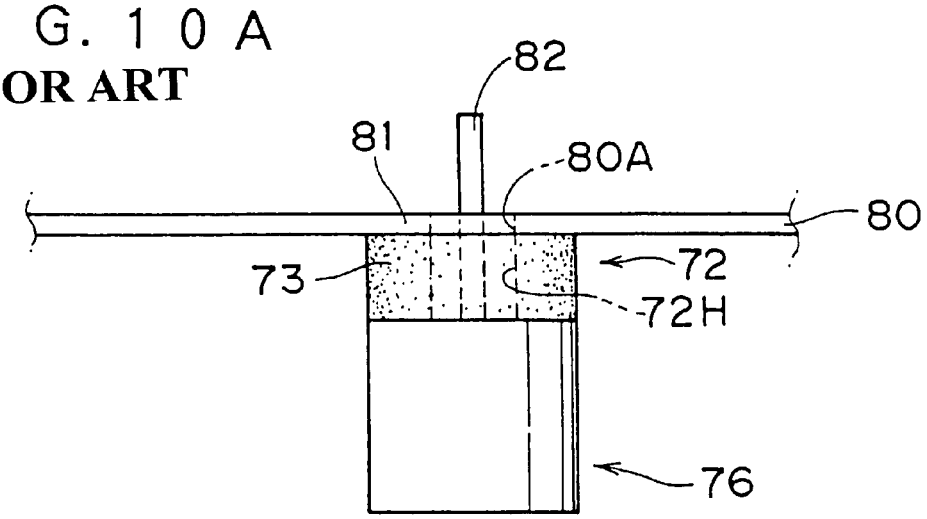
FIGS. 10A to 10C are front views respectively illustrating steps of a conventional process by which a motor is mounted to a mounting plate via a damper. It should be noted that the damper is conceptually depicted.
Figure 10B:
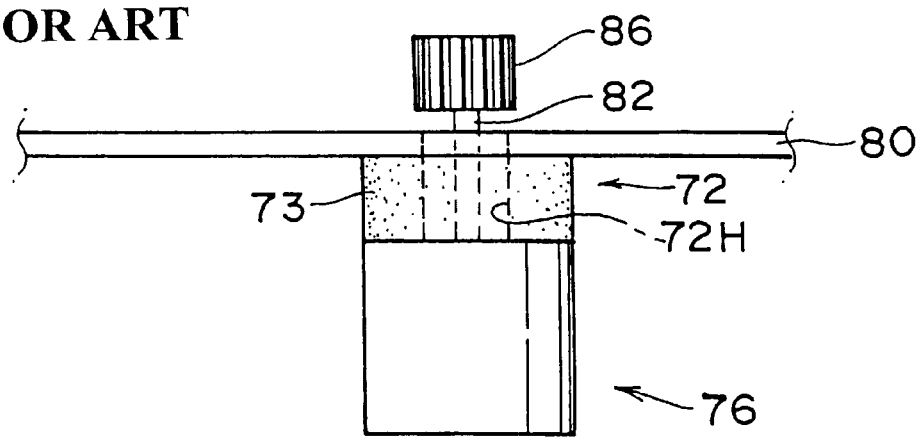
Figure 10C:
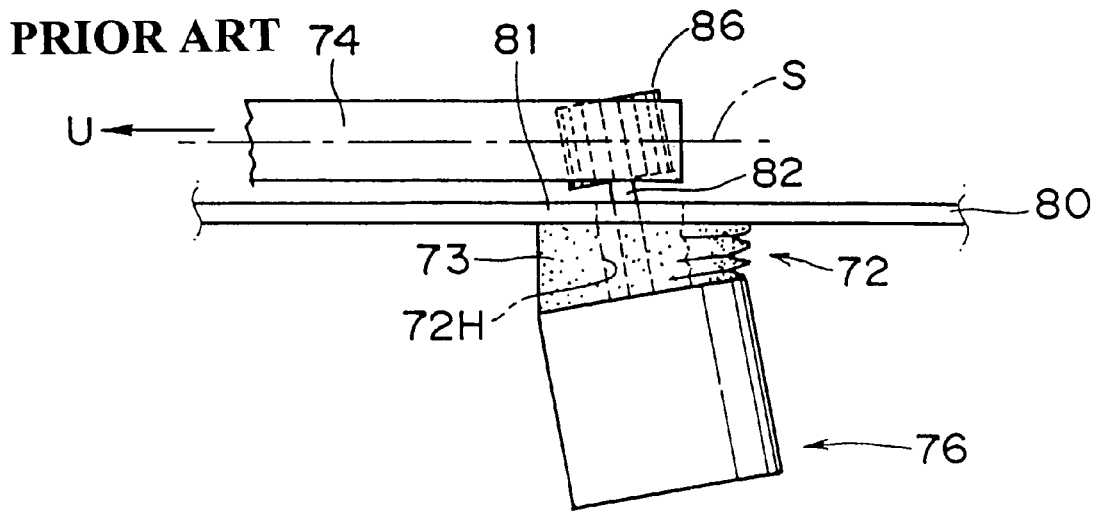

Next, as illustrated in FIG. 8B, the upper end of the drive shaft 69T is mounted with a pulley 14.

Moreover, as illustrated in FIG. 8C, when the timing belt 20 is trained around the pulley 14, a bending moment is applied by a force being applied to the drive shaft 69T in the U direction. As a result, the gear 15 abuts against the gear 69G, whereby a state in which the drive shaft 69T is parallel to the target mounting direction Z, i.e., a state in which the drive shaft 69T is orthogonal to the orbital plane S, is reached. Consequently, by driving the motor 10 in this state, the timing belt 20 is rotated forwardly or rotated in reverse parallel to the orbital plane S.

Therefore, an unbalanced load is not applied to the timing belt 20. Consequently, durability of the timing belt 20 is improved, and an excessive load is prevented from being applied to the motor 10.

Finally, although an exposure apparatus has been used as an example in the descriptions above, it goes without saying that the present invention is not limited to an exposure apparatus. Further, in addition to the timing belt, it is also possible to use a wire, steel belt, or the like.

What is claimed is:

1. A motor mounting structure having an elastic member disposed between a motor and a mounting portion to which the motor is mounted, wherein the motor is mounted to the mounting portion via the elastic member, and a motor shaft of the motor is inclined at a predetermined angle, with respect to a target mounting direction set in advance, the motor shaft being oriented to the target mounting direction set in advance by applying a force to the motor shaft, whereby a bending moment is applied to the motor, and deforming the elastic member.

2. A motor mounting structure according to claim 1, wherein the angle of the motor shaft at the time of mounting is adjusted in accordance with a thickness of the elastic member.

3. A motor mounting structure according to claim 1, wherein the angle of the motor shaft at the time of mounting is adjusted in accordance with a configuration of the elastic member.

4. A motor mounting structure according to claim 1, wherein the angle of the motor shaft at the time of mounting is adjusted at an inclination angle of the mounting portion with respect to the target mounting direction.

5. A motor mounting structure according to claim 2, wherein the elastic member is provided with a through-hole through which the motor shaft is passed, the through-hole being sufficiently large enough so that the motor shaft does not make contact with an inner wall of the through-hole, and the configuration of the through-hole being formed in a long, substantial ellipse in a direction in which a tensile force acts.

6. A motor mounting structure according to claim 4, wherein the elastic member is provided with a through-hole through which the motor shaft is passed, the through-hole being sufficiently large enough so that the motor shaft does not make contact with an inner wall of the through-hole, and the configuration of the through-hole being formed in a long, substantial ellipse in a direction in which a tensile force acts.

7. A motor mounting structure according to claim 2, wherein a hardness of the elastic member changes at a tension side and a compression side when a load is applied to the motor shaft.

8. A motor mounting structure according to claim 2, wherein the thickness of the elastic member changes at a tension side and a compression side when a load is applied to the motor shaft.

9. A motor mounting structure according to claim 1, wherein the mounting portion is positioned opposite of the motor shaft with respect to the motor.

10. A motor mounting structure according to claim 9, wherein the mounting portion has a substantially L shape when seen in cross section.

11. A motor mounting structure according to claim 10, wherein the elastic member is disposed so as to make contact with a side surface and a bottom surface of the motor.

12. A motor mounting structure according to claim 11, wherein a hardness of the elastic member changes in correspondence with a difference in compressive force applied thereto when a load is applied to the motor shaft.

13. A damper for absorbing vibration between a motor and a motor mounting portion, the damper comprising:

(a) a pair of retention plates, one retention plate being mountable to the motor mounting portion and the other retention plate being mountable to the motor; and (b) a resiliently deformable member having opposite ends, each end having a periphery, with one end con nected to one of the retention plates and the opposite end connected to the other retention plate, the resiliently deformable member having opposite sides extending from the periphery of one end to the other of the resiliently deformable member, with one side being longer than the opposing side.

14. The damper of claim 13, wherein the motor includes a motor shaft, and a slot is defined through the retention plates and the resiliently deformable member which receives the motor shaft therethrough when one of the retention plates is mounted to the motor.

15. The motor mounting structure according to claim 1, wherein the motor mounting structure further comprises a stopper that maintains a posture of the motor shaft on which a moment has acted said stopper provided to abut the housing of the motor.

* * * * *